(12) United States Patent
Yang et al.

(10) Patent No.: US 9,731,548 B2
(45) Date of Patent: Aug. 15, 2017

(54) WHEEL RIM RETAINER

(71) Applicants: Guirong Yang, Beijing (CN); Yingjie Qi, Beijing (CN)

(72) Inventors: Guirong Yang, Beijing (CN); Yingjie Qi, Beijing (CN)

( * ) Notice: Subject to any disclaimer, the term of this patent is extended or adjusted under 35 U.S.C. 154(b) by 136 days.

(21) Appl. No.: 14/597,242

(22) Filed: Jan. 15, 2015

(65) Prior Publication Data

US 2015/0231919 A1 Aug. 20, 2015

(30) Foreign Application Priority Data

Jan. 15, 2014 (CN) .......................... 2014 1 0018534
Jan. 15, 2014 (CN) ..................... 2014 2 0025091 U

(51) Int. Cl.
*B60B 25/20* (2006.01)
*B60B 21/12* (2006.01)
*B60C 17/04* (2006.01)
*B60B 21/02* (2006.01)

(52) U.S. Cl.
CPC ............ *B60B 21/12* (2013.01); *B60C 17/041* (2013.04); *B60B 21/026* (2013.01); *B60B 2900/523* (2013.01)

(58) Field of Classification Search
CPC . B60B 21/12; B60B 21/026; B60B 2900/523; B60B 25/22; B60C 17/041
USPC ...... 152/381.4, 381.5, 381.6, 516, 520, 375, 152/379.4, 400
See application file for complete search history.

(56) References Cited

U.S. PATENT DOCUMENTS

| 4,359,730 | A | * | 11/1982 | Kunikane | ............... G09G 3/04 345/467 |
|---|---|---|---|---|---|
| 4,784,202 | A | * | 11/1988 | White | ................. B60B 21/12 152/381.5 |
| 4,823,854 | A | * | 4/1989 | Payne | .................... B60B 21/12 152/158 |
| 5,000,240 | A | * | 3/1991 | Jones, Jr. | ............. B60C 15/028 152/379.5 |
| 5,060,706 | A | * | 10/1991 | Jones | ................... B60C 15/028 152/379.3 |
| 7,040,365 | B2 | * | 5/2006 | Lust | ....................... B60B 21/04 152/381.5 |
| 2003/0020320 | A1 | * | 1/2003 | Yukawa | ................... B60B 3/04 301/6.91 |
| 2005/0072506 | A1 | * | 4/2005 | Tanaka | ................... B60C 17/04 152/400 |

* cited by examiner

*Primary Examiner* — S. Joseph Morano
*Assistant Examiner* — Jean Charleston
(74) *Attorney, Agent, or Firm* — Raymond Y. Chan; David and Raymond Patent Firm

(57) ABSTRACT

A wheel rim retainer includes an annular unit, a first end connecting member movably coupled at one end of the annular unit, and a second end connecting member movably coupled at an opposed end of the annular unit. The annular unit includes a plurality of hinged members movably coupled with each other in an edge-to-edge manner, wherein each of the hinged members has a width larger than a width of the wheel well. The second end connecting member is detachably coupled with the first end connecting member for encircling the hinged members around a hub surface of a wheel rim to cover a wheel well thereof so as to prevent a bead of a tire falling at the wheel rim when the tire is deflated.

3 Claims, 7 Drawing Sheets

WHEEL RIM RETAINER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a vehicle wheel rim, and more particularly to a wheel rim retainer which comprises a plurality of hinged-members fastened around the vehicle wheel rim for use as a run-flat assembly and/or a bead-lock assembly.

Description of Related Arts

Pneumatic tires are commonly mounted on a wheel rim A10 at a position that two beads of the tire are mounted at two bead flanges of the wheel rim A10, as shown in FIG. 8. An annular wheel well A11 is generally formed on a circumferential hub surface of the wheel rim A10 between the two bead flanges therebetween. The wheel well A11 allows the tire to be easily installed into or remove from wheel rim A10 by placing one of the beads of the tire at the wheel bead to hold the tire in position.

When the tire pressure of the vehicle is lower than the standard tire pressure, or the tire of the vehicle is punctured by a sharp object (such as nail, etc.), the pressure of the tire of the vehicle is gradually decreased especially during driving. In other words, the friction between the tire and the ground is multiply increased. Therefore, the temperature of the tire will be dramatically increased that the tire will become softer and the strength thereof will be dramatically decreased as well. In such situation, the occurrence rates of flat tires for the vehicle will dramatically increase especially when driving at high speed. For example, when the tire pressure is dramatically dropped due to a blowout or puncture during running, the driver will loss the control of the vehicle easily. As a result, collision of vehicles may occur. Seriously, the vehicle may be flipped over due to the flat tire. Especially when the bead of the flat tire falls into the wheel well A11 of the vehicle rim, the bead flange of the vehicle rim will be exposed to run on the road surface, as shown in FIG. 9. Vehicle explosion may occur due to the sparks generated by the friction between the bead flange of the vehicle rim and the road surface.

An annular fastener is provided in the current market to fasten around the hub surface of the wheel rim A10 for supporting the beads in position. Generally speaking, the annular fastener comprises a C-shaped elastic band having a C-shape two free ends, and a screw fastener fastening the free ends of the elastic band in order to encircle the elastic band around the hub surface of the wheel rim A10 for covering the wheel well A11. An improved annular fastener may include two elastic bands and two screw fasteners fastening the elastic bands end-to-end to achieve the same function. The elastic band is usually made of plastic or metal to increase the elasticity properties so that the elastic band can be bent to overlap on the hub surface. However, it is difficult to mount the elastic band around the hub surface of the wheel rim A10 because the operator must apply relatively strong pulling force to pull two free ends of the elastic band together and to overcome the elastic force thereof. Once the elastic band is installed, the screw fastener will be eventually loosened by the elastic force of the elastic band and/or the rotational movement of the wheel rim A10. When the elastic band is loosen, the wheel well A11 cannot be covered by the elastic band. More importantly, the inner surface of the tire may be cut by the elastic band, which may damage the tire.

Accordingly, different sizes of wheel rim A10 may have different sizes of wheel well A11. The circumference of the elastic band must match with the width of the wheel well A11. In addition, in order to retain the elastic band in position, a plurality of wedges are provided along the elastic band, wherein the wedges are seated at the wheel well A11 and are supposed to prevent any lateral movement of the elastic band on the hub surface of the wheel rim A10. However, if the elastic band is made of relative rigid material to support the beads of the tire, the installation of the elastic band will be difficult to band in curve configuration and to match with the hub surface. If the elastic band is made of relative soft material for easy installation, the elastic band may not be strong enough to support the beads of the tire. Furthermore, the wedges cannot be securely engaged within the wheel well A11, via any engagement structure, that the lateral movement of the elastic band will cause the misalignment of the annular fastener around the hub surface of the wheel rim A10. Therefore, the annular fastener cannot ensure the basic supporting function due to a blowout and may also seriously damage the tire.

SUMMARY OF THE PRESENT INVENTION

A main object of the present invention is to provide a wheel rim retainer for use as a run-flat assembly and/or a bead-lock assembly, wherein the wheel rim retainer comprises:

an annular unit which comprises a plurality of hinged members movably coupled with each other in an edge-to-edge manner, such that the hinged members can be moved correspondingly with each other to fittingly overlap around a wheel well of a wheel rim;

a first end connecting member movably coupled at one end of the annular unit;

a second end connecting member having a first end movably coupled at an opposed end of the annular unit and a second end detachably coupled with the first end connecting member; and a plurality of well retainers spacedly and radially extended from an inner surface of the annular unit, wherein the well retainers are protruded from inner surfaces of the hinged members.

When the first and second end connecting members are detachably coupled with each other, the hinged members of the annular unit are moved in a circular configuration for encircling around a hub surface of the wheel rim at a position that the well retainers are engaged with the wheel well of the wheel rim. In particular, the annular unit will form the circular configuration to cover the wheel well of the wheel rim.

Another object of the present invention is to provide a wheel rim retainer, wherein the well retainers are engaged with the wheel well of the wheel rim to support the hinged members when the tire is blown out.

Accordingly, the wheel rim retainer further comprises a plurality of tire engaging elements spacedly provided on an outer surface of the annular unit. In particular, the tire engaging elements are spacedly protruded on the outer surfaces of the hinged members. The tire engaging elements are engaged with the inner surface of the flat tire so as to prevent the tire being free-rotated around the wheel rim when the tire is deflated, especially during braking operation of the vehicle.

Another object of the present invention is to provide a wheel rim retainer, wherein the well retainers are securely and frictionally engaged with the bottom wall of the wheel well. In particular, each of the well retainers comprises a well supporter protruded from the inner surface of the hinged member and a well engager coupled at the well supporter to bias against the wheel well of the wheel rim.

Furthermore, each of the well retainers further comprises a frictional element formed at a bottom side of the well engager for frictionally engaging with the bottom wall of the wheel well of the wheel rim.

It is worth mentioning that each of the frictional elements has a plurality of frictional treads for engaging with the bottom wall of the wheel well of the wheel rim.

Alternatively, each of the frictional elements provides a plurality of frictionally contacting points for frictionally contacting with the bottom wall of the wheel well of the wheel rim.

Accordingly, the wheel rim retainer further comprises an electronic device or a monitoring device, such as a signal emitting device, which is provided on at least one of the hinged members.

Preferably, the width of each of the hinged members is larger than or equal to a width of a bottom wall of the wheel well to ensure the wheel well to be covered by the hinged members. In addition, the overall thickness of the wheel rim retainer, i.e. the thickness of the hinged member and the height of the well retainer, is smaller than a distance between the bottom wall of the wheel rim and the top edge of the bead flange of the wheel rim.

Preferably, the two adjacent hinged members are movably connected with each other by the pivot shaft.

Preferably, the first end connecting member and the corresponding hinged member are movably connected with each other by the pivot shaft, and the second end connecting member and the hinged member are movably connected with each other by the pivot shaft. The first end connecting member and the second end connecting member are detachably connected with each other by a fastener, such as a bolt and nut connection.

The present invention provides the following advantages:

1. The structure of the present invention is rational, wherein the hinged members, the first end connecting member, and the second end connecting member can be made of rigid materials, so the present invention can provide a better supporting effect due to tire blowout, and further improve the driving safety, so as to minimize the risk coefficient of the tire. In other words, since the wheel well of the wheel rim is covered by the annular unit, the present invention can prevent the bead of the flat tire being fallen at the wheel well and the bead flange of the vehicle rim being exposed to run on the road surface.

2. The present invention provides the best engagement between with the bottom side of the wheel well and the well retainers after installation, so as to ensure the control the wheel rim by the driver, such as operating the braking system of the vehicle. In addition, the wheel rim retainer will prevent the free-rotation of the tire, via the tire engaging elements of the present invention, with respect to the wheel rim after the tire is blown out.

3. The frictional engagement between the bottom side of the wheel well and the well retainers will prevent the wheel rim retainer being free-rotated with respect to the wheel rim. In other words, the frictional engagement of the wheel rim retainer will ensure the wheel rim retainer to be rotated with the wheel rim concurrently.

4. The present invention is easy to be disassembled and assembled through the movable engagement of the hinged member. Especially during transportation and storage, the present invention can be disassembled, so the volume of the present invention is reduced to facilitate the transportation.

5. The electronic device or a monitoring device, such as a signal emitting device, at the hinged member is able to monitor and control the condition and proper connection of the wheel rim retainer, as well as the status of the tire, such as tire pressure.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
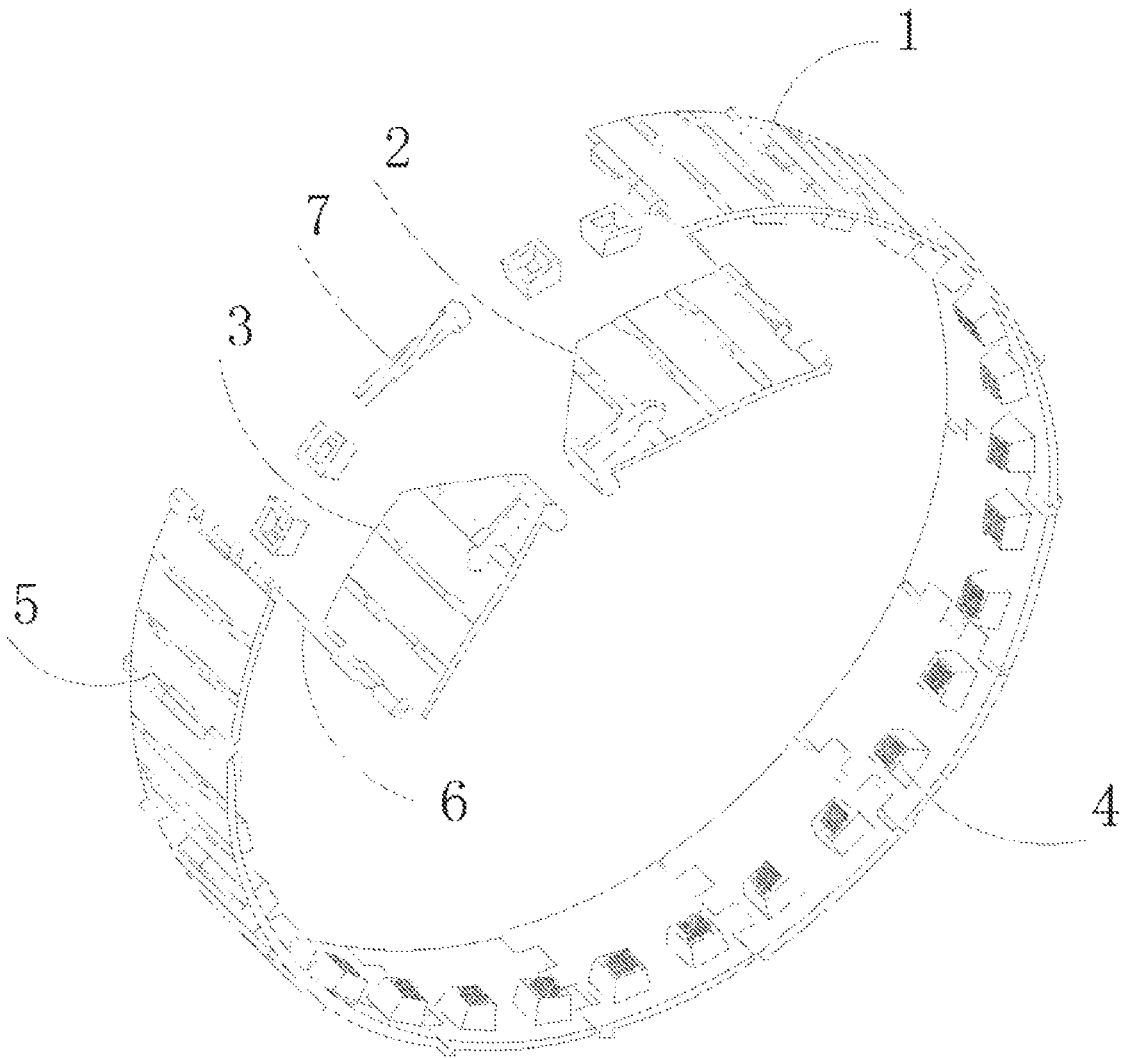
FIG. 1 is a perspective view a wheel rim retainer according to a preferred embodiment of the present invention.
Figure 2:
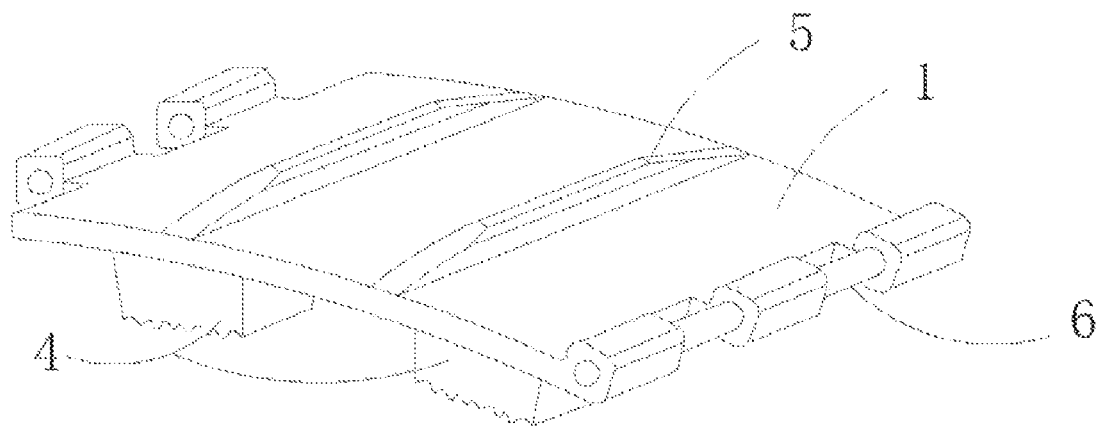
FIG. 2 is a perspective view of a hinged-member of the wheel rim retainer according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 6 of the drawings, a wheel rim retainer for use as a run-flat assembly and/or a bead-lock assembly according to a preferred embodiment of the present invention is illustrated, wherein the wheel rim retainer comprises an annular unit which comprises a plurality of hinged members 1 movably coupled with each other edge-to-edge, a first end connecting member 2 movably coupled at one end of the annular unit, and a second end connecting member 3 movably coupled at an opposed end of the annular unit. Accordingly, the hinged members 1 are detachably coupled with each other while the first and second end connecting members 2, 3 are detachably coupled at two ends of the annular unit.

The wheel rim retainer further comprises a plurality of well retainers 4 spacedly protruded from inner sides of the hinged members 1 and radially extended toward a center of the annular unit. Preferably, the well retainers 4 are also formed at the inner sides of the first and second connecting members 2, 3. Accordingly, the well retainers 4 are aligned with each other to engage with the wheel well A11 of the wheel rim A10.

According to the preferred embodiment, the first and second connecting members 2, 3 are detachably coupled with each other to form an annular configuration of the annular unit to fasten to a wheel rim A10, wherein the hinged members 1 are overlapped on a hub surface of the wheel rim A10 at a position that the well retainers 4 are engaged with a wheel well A11 indented on the hub surface and between two bead flanges A12 of the wheel rim A10.

Accordingly, the first and second connecting members 2, 3 are detachably coupled via a fastener 7, such as bolt, rivet or other connection members. Two adjacent hinged members 1 are hinged by a pivot shaft 6 to pivotally connect the hinged members 1 with each other edge-to-edge, preferably the transverse edges of the hinged members 1 are pivotally coupled with each other, such that the hinged members 1 are able to pivotally move with each other for matching the circumferential curvature of the hub surface of the wheel rim A10. Due to the detachable feature of the hinged members 1, the number of hinged members 1 can be selectively adjusted to match with the circumferential size of the hub surface of the wheel rim A10. In other words, for a bigger size of the wheel rim A10, the length of the annular unit can be prolonged by adding a predetermined number of hinged members 1 until the length of the annular unit matches with the circumferential size of the hub surface of the wheel rim A10. It is worth mentioning that the first and second connecting members 2, 3 are detachably coupled with the hinged members 1 via the pivot shafts 6 respectively. In addition, when increasing numbers of the hinged members 1, the numbers of well retainers 4 will be increased. Preferably, there are two well retainers 4 spacedly formed at each hinged member 1.

Figure 6:
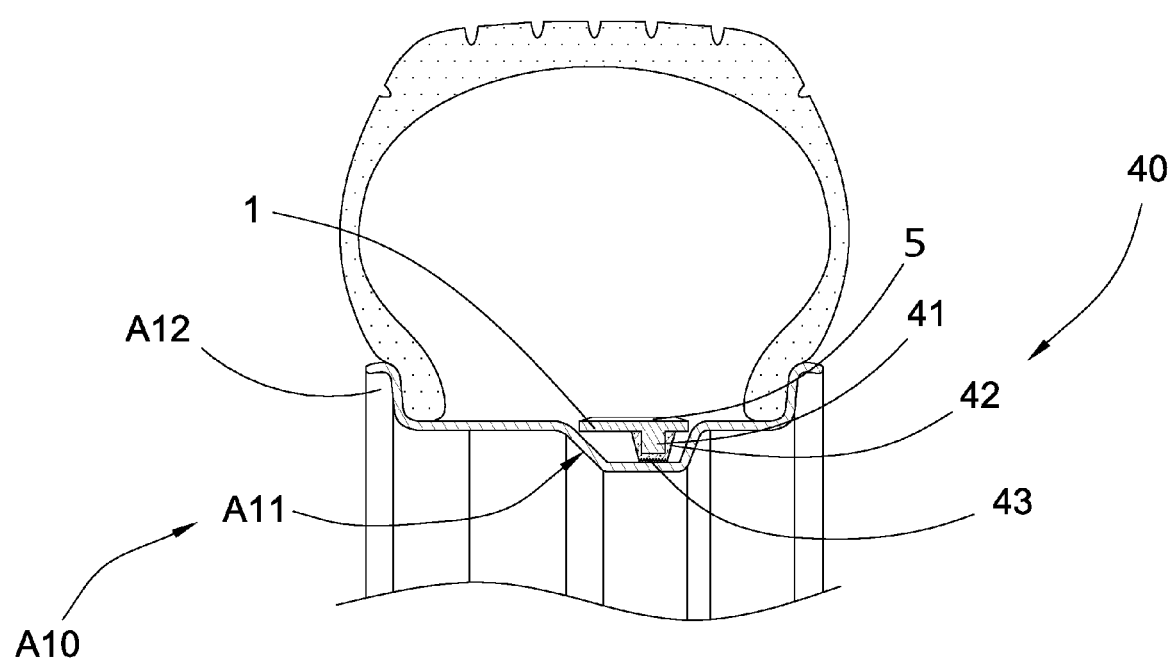
FIG. 6 is a sectional view of the wheel rim retainer installed into the wheel rim according to the above preferred embodiment of the present invention.

For storage and handling purpose, the hinged members 1, the first end connecting member 2, and the second end connecting member 3, can be detached with each other, such that the wheel rim retainer of the present invention can be disassembled to substantially reduce the volume thereof. Depending the circumferential size of the wheel rim A10, the user is able to assemble the hinged members 1, the first end connecting member 2, and the second end connecting member 3 via the pivot shafts 6 to install into the wheel rim A10. It is worth mentioning that a width of each of the hinged members 1 is configured corresponding to a width of the wheel well A11 in order to cover the wheel well A11, such that the beads of the tire are retained normally at bead flange A12 of the wheel rim A10 as the conventional structure while the well retainers 4 are engaged with a bottom side of the wheel well A11. In other words, the beads of the tire will be retained and blocked by the longitudinal edges of the hinged members 1, as shown in FIG. 6, to prevent the bead of the tire to be fallen at the wheel well A11. In case of tire blowout during driving, the beads of the tire are held in the installed position to prevent one of the beads of the tire falling at the wheel well A11 of the wheel rim A10. Since the hinged members 1 are pivotally moved with each other, no elastic force is generated when the hinged members 1 are overlapped on the hub surface of the wheel rim A10. As a result, the hinged members 1 are selectively moved to form a polygonal configuration to match with the curvature of the hub surface of the wheel rim A10 to ensure the surface alignment between the hinged members 1 and the hub surface of wheel rim A10. It is worth mentioning that the angle between the hinged members 1 can be selectively adjusted to ensure the engagement between the well retainers 4 and the wheel well A11 of the wheel rim A10. As a result, in case of tire blowout, the present invention ensures the tire to be encircled around the wheel rim A10 to cover the bead flanges A12 thereof so as to provide a driving safety feature of the wheel rim A10.

According to the preferred embodiment, the wheel rim retainer further comprises a plurality of tire engaging elements 5 spacedly formed on an outer surface of each of the hinged members 1, wherein the tire engaging elements 5 are elongated elements integrally and transversely protruded from the outer surfaces of the hinged members 1. In case of tire blowout, the deflated tire will be collapsed on the hinged members 1. As a result, the tire engaging elements 5 will engage with the inner surface of the tire to ensure the tire to be encircled around the wheel rim A10 to cover the bead flanges A12 thereof. Preferably, the tire engaging elements 5 are also formed at the inner sides of the first and second connecting members 2, 3.

According to the existing problem of the wheel rim A10 and the tire, when the tire is blown out, the flat tires will free to rotate with respect to the wheel rim A10. Even though the speed of the vehicle is reduced, the free rotation of the tire will cause the vehicle to skid in an uncontrolled manner. Therefore, the tire engaging elements 5 can solve the above mentioned problem by engaging the tire engaging elements 5 with the inner surface of the flat tire so as to prevent the tire being free-rotated around the wheel rim A10. It is worth mentioning that the number of the hinged members 1 is adjustable depending on the size of the wheel rim A10, the number of the tire engaging elements 5 is sufficiently provided with respect to the number of the hinged members 1 to match with the size of the tire. Preferably, at least one tire engaging element 5, preferably two tire engaging elements 5, is arranged on each hinged member 1 while being cost effective, in such a manner that the tire will be held by one or more tire engaging elements 5 to provide the lowest manufacturing cost with the highest tire holding efficiency.

Figure 3:
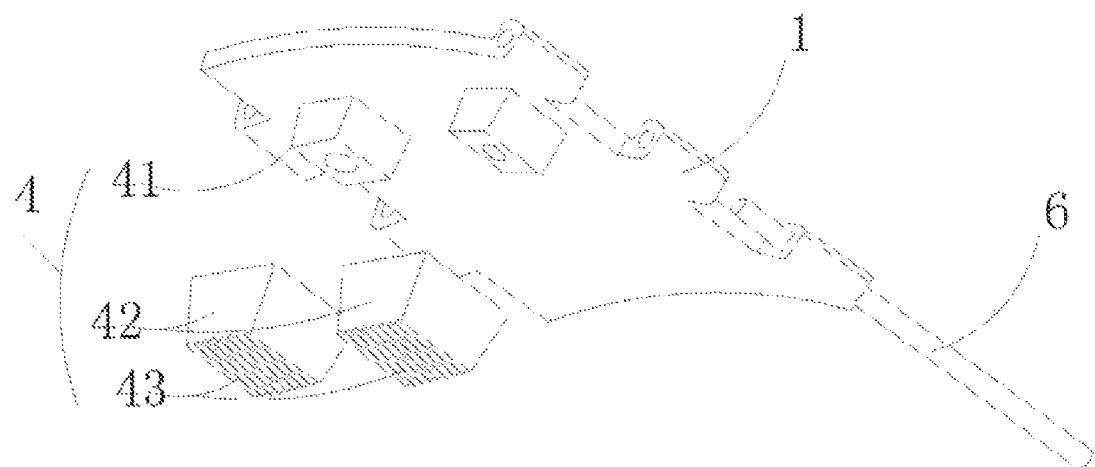
FIG. 3 is an exploded bottom view of the hinged-member of the wheel rim retainer according to the above preferred embodiment of the present invention.
Figure 4:
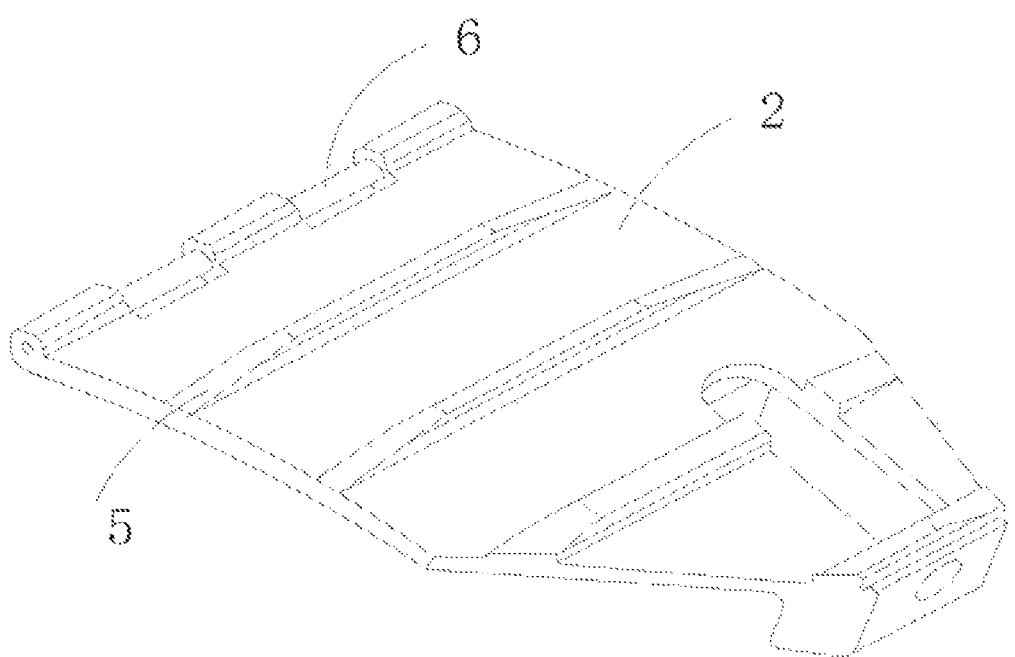
FIG. 4 is a perspective top view of a first end connecting member of the wheel rim retainer according to the above preferred embodiment of the present invention.
Figure 5:
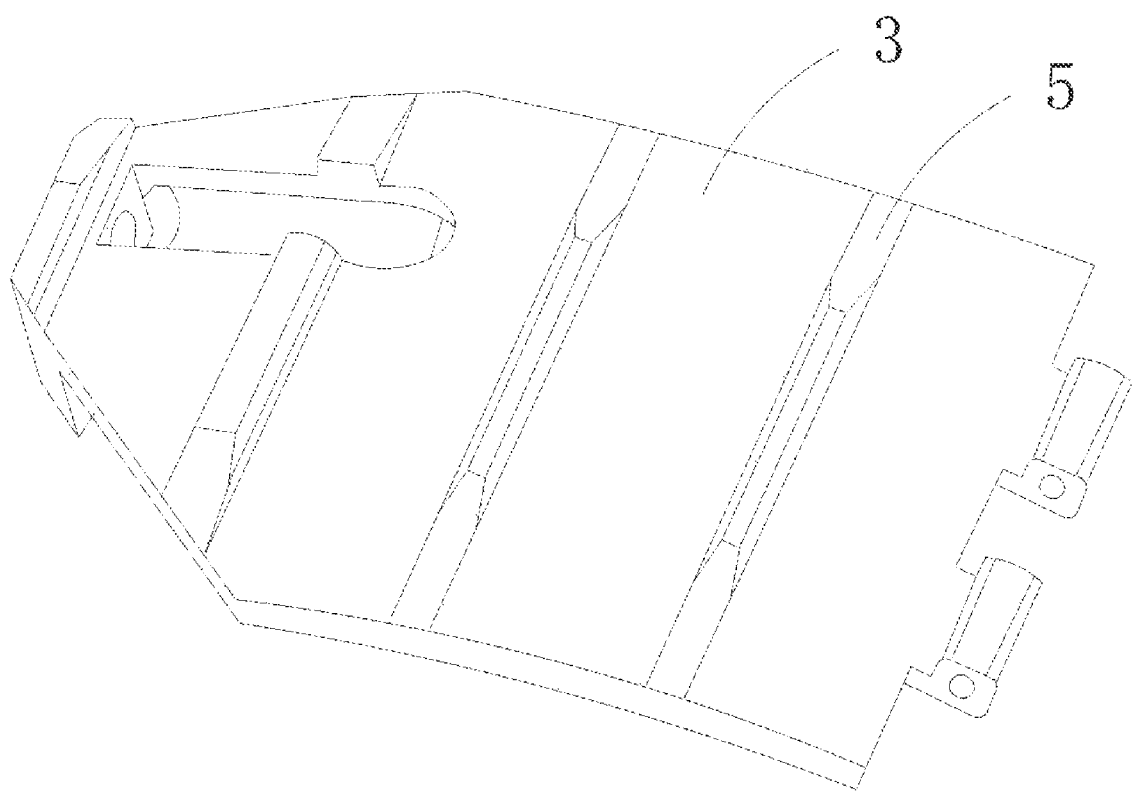
FIG. 5 is a perspective view of a second end connecting member of the wheel rim retainer according to the above preferred embodiment of the present invention.

As shown in FIG. 3, each of the well retainers 4 comprises a well supporter 41 protruded from the inner surface of the hinged member 1 and a well engager 42 coupled at the well supporter 41 to bias against the bottom wall of the wheel well A11 of the wheel rim A10. Preferably, the well supporter 41 is integrally protruded from the inner surface of the hinged member 1 and the well engager 42 is detachably coupled at the well supporter 41. Therefore, different sizes of well engagers 42 can be selectively replaced to match with the size of the wheel well A11 of the wheel rim A10.

Accordingly, each of the well retainers 4 further comprises a frictional element 43 formed at a bottom portion of the well engager 42 for frictionally engaging with the bottom wall of the wheel well A11 of the wheel rim A10, as shown in FIG. 6. Preferably, the frictional element 43 is integrally formed with the well engager 42.

Preferably, each of the frictional elements 43 has a plurality of frictional treads formed at the bottom side of the well engager 42 for frictionally engaging with the bottom wall of the wheel well A11 of the wheel rim A10.

Alternatively, each of the frictional elements 43 provides a plurality of frictionally contacting points formed at the bottom side of the well engager 42 for frictionally contacting with the bottom wall of the wheel well A11 of the wheel rim A10.

According to the preferred embodiment, each of the well retainers 4 has a quadrilateral cross section, preferably trapezoidal cross section, wherein at least one well retainer 4 is formed at each hinged member 1. When the hinged members 1 are folded to form an annular configuration, the well retainers 4 are aligned to radially point toward a center of the annular configuration of the annular unit, such that the hinged members 1 are overlappedly encircled with the hub surface of the wheel rim A10 to engage the well retainers 4 at the wheel well A11 of the wheel rim A10. Accordingly, the conventional well support is entirely made of frictional material to contact with the well surface of the wheel well A11 because the size and shape of the conventional well support are fixed and unchangeable. As a result, the conventional well support will not perfectly fit for different sizes and shapes of the wheel rims A10 that the contact between the conventional well support and the wheel well A11 will be minimized. The cost of the conventional well support will be increased by increasing the use of the frictional material. In other words, the conventional well support cannot engage with the bottom side of the wheel well A11. In view of the present invention, the well supporter 41 is integrally provided at the inner surface of each of the hinged members 1, wherein the well engager 42 with the corresponding size and shape can be replaceably coupled with the well supporter 41. It is worth mentioning that each of the well engager 42 has a coupling slot that the well supporter 41 is inserted into the coupling slot of the well engager 42 in order to detachably couple the well engager 42 with the well supporter 41. Furthermore, the frictional element 43 is provided at the bottom portion of the well engager 42 to engage with the bottom wall of the wheel well A11, such that the material used for the well retainer 4 to frictional engage with the wheel well A11 will be substantially reduced, so as to minimize the cost of the well retainer 4. Preferably, two well supporters 41 are provided at each of the hinged members 1, such that two well engagers 42 are detachably coupled with the well supporters 41 respectively at each of the hinged members 1. As a result, each of the hinged members 41 is supported above the wheel well A11 in a balanced manner to retain the beads of the tire in position. In addition, since the frictional elements 43 are frictionally engaged with the bottom wall of the wheel well A11, the hinged members 1 are unable to free-rotate with respect to the wheel rim A10. In case of tire blowout, the frictional engagement between the well retainers 4 and the wheel well A11 will prevent the hinged members 1 being free-rotated around the wheel rim A10, so as to ensure the speed of the vehicle to be properly reduced via the braking system of the vehicle. It is worth mentioning that each of the frictional elements 43 has a plurality of frictional treads for engaging with the bottom wall of the wheel well A11 of the wheel rim A10, as shown in FIG. 3. Alternatively, each of the frictional elements 43 provides a plurality of frictionally contacting points for frictionally contacting with the bottom wall of the wheel well A11 of the wheel rim A10, as shown in FIG. 1.

Accordingly, the wheel rim retainer further comprises an electronic device or a monitoring device which is provided on at least one of the hinged members 1.

In particular, the electronic device or the monitoring device can be installed at one of the hinged members 1. Accordingly, two or more electronic devices or the monitoring devices can be installed into different hinged members 1 respectively for monitoring the hinge members 1, the first and second end connecting members 2, 3, and/or the well retainers 4, so as to ensure the proper operation of each of the hinge members 1, the first and second end connecting members 2, 3, and/or the well retainers 4. The proper operation of the present invention will ensure the flat tire to be supported by the wheel rim retainer during accident.

It is appreciated that a tire pressure monitoring device can also be installed into at least one of the hinged members 1 for monitoring the tire pressure of the tire, so as to ensure the corrected tire pressure thereof.

Preferably, the width of each of the hinged members 1 is larger than a width of the bottom wall of the wheel well A11 to ensure the wheel well A11 to be covered by the hinged members 1. In addition, the overall thickness of the wheel rim retainer, i.e. the thickness of the hinged member 1 and the height of the well retainer 4, is smaller than a distance between the bottom wall of the wheel rim A10 and the top edge of the bead flange of the wheel rim A10. Preferably, a height of each of the well retainer 4 is larger than a depth of the wheel well A11.

In other words, the configurations of the present invention, i.e. (i) the width of each of the hinged members 1 being larger than or equal to the width of the bottom wall of the wheel well A11, and (ii) the overall thickness of the wheel rim retainer being smaller than a distance between the bottom wall of the wheel rim A10 and the top edge of the bead flange of the wheel rim A10, will ensure there is no offset between the wheel rim retainer and the wheel rim A10 when the tire is blown out. Therefore, after the installation of the wheel rim retainer, the hinged members 1 will be located above and coupled with the wheel well A11 as well as cover the wheel well A11 so as to prevent the bead falling at the wheel well A11 when the tire is deflated. In addition, the width of the hinged member 1 is large enough to prevent the hinged member 1 falling at the wheel well A11 of the wheel rim A10 when the tire is deflated, so as to maintain the supporting function of the wheel rim retainer.

As shown in FIG. 6, the width of the hinged member 1 matches with an opening width of the wheel well A11. Accordingly, the wheel well A11 has a uniform depth. When the wheel rim retainer of the present invention is disposed at the wheel well A11, the overall thickness of the wheel rim retainer, i.e. the thickness of the hinged member 1 and the height of the well retainer 4, is slightly larger than the depth of the wheel well A11. Therefore, the hinged members 1 will be supported above the opening of the wheel well A11 to cover the wheel well A11.

Figure 7C:
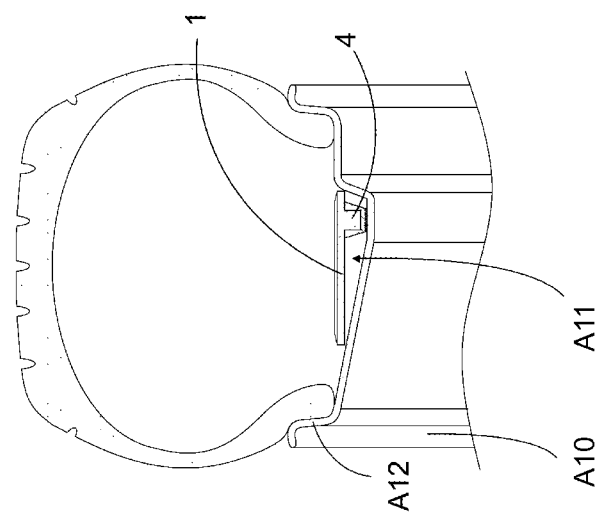
FIGS. 7A to 7C illustrate the wheel rim retainer for different configurations of the wheel well according to the above preferred embodiment of the present invention.
Figure 7B:
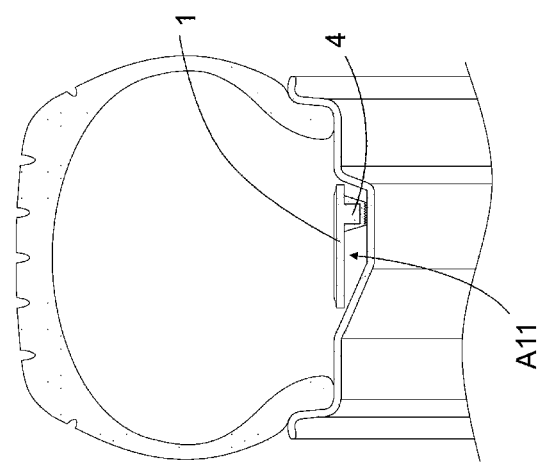
Figure 7A:
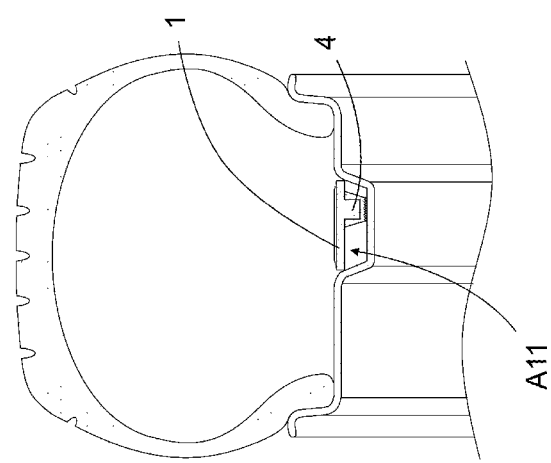
Figure 9:
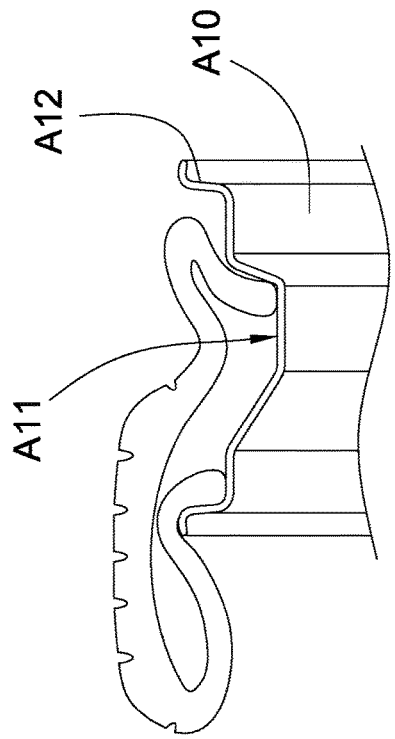
FIG. 9 illustrates a prior art showing the bead of the tire falling at the wheel well of the wheel rim when the tire is deflated.
Figure 8:
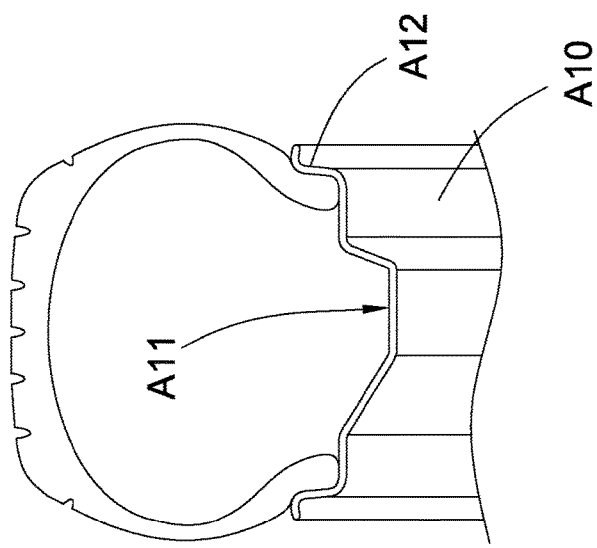
FIG. 8 illustrates a prior art showing the tire mounted to the wheel rim.

According to the preferred embodiment, the wheel rim retainer of the present invention can fit to different configurations of the wheel well A11 as shown in FIGS. 7A to 7C. In particular, the overall thickness of the wheel rim retainer, i.e. the thickness of the hinged member 1 and the height of the well retainer 4, is larger than or equal to the depth of the wheel well A11, i.e. the distance between the bottom wall of the wheel well A11 and the hub surface of the wheel rim A10, in order to ensure the wheel well A11 to be covered by the hinged members 1.

FIG. 7A illustrates a first alternative configuration of the wheel rim retainer, wherein the wheel well A11 has a uniform depth. When the wheel rim retainer of the present invention is disposed at the wheel well A11, the overall thickness of the wheel rim retainer, i.e. the thickness of the hinged member 1 and the height of the well retainer 4, matches with the depth of the wheel well A11. Therefore, the hinged members 1 will be supported at the opening of the wheel well A11 to align with the hub surface of the wheel rim A10 and to cover the wheel well A11.

FIG. 7B illustrates a second alternative configuration of the wheel rim retainer, wherein the wheel well A11 has a steeper portion at one side and a shallow portion at an opposed side. When the wheel rim retainer of the present invention is disposed at the wheel well A11, the well retainer 4 is frictionally engaged with the bottom wall of the wheel well A11 at the steeper portion thereof. The width of the hinged member 1 is prolonged and extended to cover the shallow portion of the wheel well A11. Therefore, the hinged members 1 will be supported at the opening of the wheel well A11 to cover the wheel well A11.

FIG. 7C illustrates a third alternative configuration of the wheel rim retainer, wherein the wheel well A11 has a steeper portion at one side and a shallow portion at an opposed side to extend to the corresponding bead flange A12 of the wheel rim A10. When the wheel rim retainer of the present invention is disposed at the wheel well A11, the well retainer 4 is frictionally engaged with the bottom wall of the wheel well A11 at the steeper portion thereof. The width of the hinged member 1 is prolonged and extended to cover the shallow portion of the wheel well A11. Therefore, the hinged members 1 will be supported to align with the hub surface of the wheel rim A10 at the steeper portion of the wheel well A11 and to cover the wheel well A11.

Preferably, the two adjacent hinged members 1 are movably connected with each other by the pivot shaft 6.

Preferably, the first end connecting member 2 and the corresponding hinged member 1 are movably connected with each other by the pivot shaft 6, and the second end connecting member 3 and the hinged member 1 are movably connected with each other by the pivot shaft 6, and the first end connecting member 2 and the second end connecting member 3 are detachably connected with each other by a fastener 7, such as a bolt and nut connection.

It is worth mentioning that the hinged members 1, the first end connecting member 2, and the second end connecting member 3 can be made of different materials to cover the wheel well A11. For example, one of the hinged members 1, the first end connecting member 2, and the second end connecting member 3 can be made metal, plastic, or rubber with embedded metal wire.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wheel rim retainer for a wheel rim having a wheel well indented on a hub surface and two bead flanges to engage with beads of a tire after inflated, wherein the wheel rim retainer comprises:

an annular unit which comprises a plurality of hinged members movably coupled with each other in an edge-to-edge manner, wherein each of said hinged members has a width larger than a width of the wheel well;

a first end connecting member movably coupled at one end of said annular unit;

a second end connecting member movably coupled at an opposed end of said annular unit, wherein said second end connecting member is detachably coupled with said first end connecting member for encircling said hinged members around the hub surface of the wheel rim to cover the wheel well thereof so as to prevent the bead of the tire falling at the wheel rim when the tire is deflated;

a plurality of well retainers spacedly provided at an inner surface of said annular unit, wherein said well retainers are arranged for frictionally engaging with the wheel well when said hinged members encircle the wheel rim, wherein each of said well retainers, which is integrally protruded from an inner surface of each of said hinged members, comprises a well supporter integrally protruded from said inner surface of said hinged member and a well engager detachably coupled at said well supporter for matching with a size and shape of the wheel well, wherein each of said well retainers further comprises a frictional element integrally formed at a bottom portion of said well engager for frictionally engaging with a bottom wall of the wheel well.

2. The wheel rim retainer, as recited in claim 1, wherein each of said frictional elements has a plurality of frictional treads formed at a bottom side of said well engager for frictionally engaging with the bottom wall of the wheel well of the wheel rim.

3. The wheel rim retainer, as recited in claim 1, wherein each of said frictional elements has a plurality of frictionally contacting points formed at a bottom side of said well engager for frictionally contacting with the bottom wall of the wheel well of the wheel rim.

* * * * *